US008943152B2

(12) United States Patent
Huang et al.

(10) Patent No.: US 8,943,152 B2
(45) Date of Patent: *Jan. 27, 2015

(54) MESSAGING

(75) Inventors: Leping Huang, Tokyo (JP); Tsyoshi Kashima, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,577

(22) Filed: Apr. 10, 2012

(65) Prior Publication Data

US 2012/0196627 A1 Aug. 2, 2012

Related U.S. Application Data

(62) Division of application No. 12/316,171, filed on Dec. 9, 2008, now Pat. No. 8,176,132, which is a division of application No. 10/696,067, filed on Oct. 29, 2003, now Pat. No. 7,552,169.

(30) Foreign Application Priority Data

Nov. 11, 2002 (EP) .................................... 02257792

(51) Int. Cl.

| | |
|---|---|
| ***G06F 15/16*** | (2006.01) |
| ***H04W 4/02*** | (2009.01) |
| ***H04L 12/58*** | (2006.01) |
| ***H04W 4/06*** | (2009.01) |
| *H04W 4/18* | (2009.01) |

(52) U.S. Cl.

CPC ........... *H04W 4/021* (2013.01); *H04L 12/5865* (2013.01); *H04L 51/20* (2013.01); *H04W 4/06* (2013.01); *H04W 4/185* (2013.01)

USPC ...................... 709/206; 455/456.1; 455/456.3

(58) Field of Classification Search

CPC .... H04L 12/5865; H04L 51/20; H04W 4/021

USPC .................. 709/224, 203, 227, 206; 455/404, 455/456.1, 556, 404.1, 436, 445, 456.3; 342/45; 701/213; 370/328, 331; 340/8.1

See application file for complete search history.

(56) References Cited

U.S. PATENT DOCUMENTS

| | | | | |
|---|---|---|---|---|
| 6,486,794 B1 * | 11/2002 | Calistro et al. | ................. | 340/8.1 |
| 2002/0034947 A1 * | 3/2002 | Soliman | ........................ | 455/436 |
| 2002/0133595 A1 * | 9/2002 | Kimura et al. | ................ | 709/227 |
| 2002/0160745 A1 * | 10/2002 | Wang | ............................ | 455/404 |
| 2003/0081567 A1 * | 5/2003 | Okanoue et al. | ............. | 370/328 |

(Continued)

FOREIGN PATENT DOCUMENTS

EP 1 107 508 A1 6/2001

OTHER PUBLICATIONS

European Search Report for European Application No. 12166682.0-1232 / 2501161, dated Aug. 29, 2012, pp. 1-5.

(Continued)

*Primary Examiner* — Jungwon Chang

(74) *Attorney, Agent, or Firm* — Ditthavong & Steiner, PC

(57) ABSTRACT

A device for transmitting a message for reception by another device, comprising: a processor for adding location information to the message, before transmission, wherein the location information identifies an area within which the message is to be hosted for reception by the other device; and a transmitter for transmitting the message, with the location information.

20 Claims, 3 Drawing Sheets

(56) References Cited

U.S. PATENT DOCUMENTS

2003/0125076 A1* 7/2003 Seppala et al. ................ 455/556
2003/0144001 A1* 7/2003 Nakatsugawa et al. ....... 455/445
2004/0034470 A1* 2/2004 Workman ..................... 701/213
2005/0059409 A1* 3/2005 Vare et al. .................. 455/456.1
2005/0085239 A1* 4/2005 Cedervall .................. 455/456.1
2005/0248480 A1* 11/2005 Butler et al. .................... 342/45

OTHER PUBLICATIONS

Communication pursuant to Article 94(3) EPC for European Application No. 12 166 682.0-1803, dated Apr. 19, 2013, pp. 1-4.

* cited by examiner

MESSAGING

CROSS-REFERENCE TO RELATED APPLICATIONS

The present application is a divisional application of co-pending U.S. patent application Ser. No. 12/316,171, filed Dec. 9, 2008, which is a divisional application of U.S. patent application Ser. No. 10/696,067, filed Oct. 29, 2003 and issued as U.S. Pat. No. 7,552,169, the entirety of which are incorporated herein by reference.

TECHNICAL FIELD

Embodiments of the present invention relate to messaging. In particular, they relate to depositing electronic messages at particular locations for later retrieved by another person.

BACKGROUND OF THE INVENTION

It has been possible to drop physical messages at certain locations so that they can be picked up later by another person. For example, some railway stations provide message boards on which messages can be written.

It would be desirable to be able to deposit an electronic message at a particular location so that it can be retrieved later by another person.

It would be preferred if this could be achieved without investing in permanent infrastructure at specific locations.

BRIEF SUMMARY OF THE INVENTION

According to one aspect of the present invention there is provided a device for transmitting a message for reception by another device, comprising: a processor for adding location information to the message, before transmission, wherein the location information identifies an area within which the message is to be hosted for reception by the other device; and a transmitter for transmitting the message, with the location information.

According to another aspect of the present invention there is provided a method of locating a message within a particular area comprising the steps of: adding location information to a message, before transmission, identifying the area within which the message is to be hosted; and transmitting the message, with the location information.

According to a further aspect of the present invention there is provided a data structure for reception by a device and storage therein, comprising: a message portion and an information portion, wherein the information portion identifies an area within which the data structure will be hosted by the device.

According to a still further aspect of the present invention there is provided a device for receiving a message hosted as separate portions by a plurality of devices that are participating in an ad-hoc network and are located within an area identified by the message, comprising: a transmitter for broadcasting a request within the ad-hoc network; a receiver for receiving replies comprising portions of the message; and a processor for reproducing the message from the received portions.

According to another aspect of the present invention there is provided a device for hosting a data structure comprising a portion of a message and an information portion identifying an area while the device remains within that area, comprising: a memory for storing a data structure comprising a message portion and an information portion, wherein the information portion identifies an area; positioning means for determining the location of the device; and a transmitter controllable to transmit the data structure to another device when the positioning means indicates that the device is no longer located within the area.

Thus in some embodiments of the invention geographically dependent information (a message) is stored in an ad hoc database the distributed component parts of which may vary in time but the location of which is substantially fixed.

BRIEF DESCRIPTION OF DRAWINGS

For a better understanding of the present invention and to understand how the same may be brought into effect reference will now be made by way of example only to the accompanying figures in which.

DETAILED DESCRIPTION OF EMBODIMENT(S) OF THE INVENTION

Figure 1:
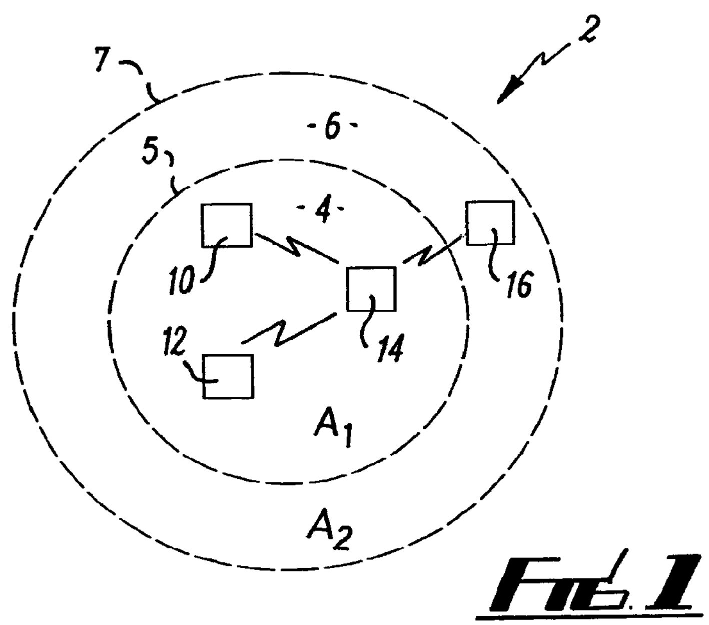
FIG. 1 illustrates an ad-hoc radio network of mobile radio transceiver devices.

FIG. 1 illustrates an ad-hoc radio network 2 of mobile radio transceiver devices 10, 12, 14, 16. The network 2 may be a Bluetooth piconet or scatternet with the mobile radio transceiver devices operating as low power radio frequency transceivers over a range of tens of meters. The network may alternatively be some other type of local area radio network.

The network 2 occupies a geographical area A2 illustratively inscribed by the circular perimeter 7. It has a sub-network 4, within the geographical area A1 inscribed by the circular perimeter 5. The sub-network 4 includes the radio transceiver devices 10, 12 and 14. The radio transceiver device 16 lies outside the area A1 and the sub-network 4.

A first message M1 is made location dependent by associating it with a geographical area e.g. A1. The message is divided into portions and the separate portions are stored only by some or all of the mobile transceiver devices 10, 12 and 14 within the area A1. When a mobile transceiver device leaves the area A1 then the portion(s) of M1 that it stores (if any) are transferred to one or more mobile transceiver devices that are presently within the area A1. The message M1 is therefore distributed amongst a plurality of mobile transceiver devices presently located within the area A1 and the identity of the plurality of transceiver devices can change as mobile transceiver devices leave and enter the area A1. The portions of the message M1 are therefore stored in a first adaptive database that comprises an ad-hoc network of transceiver devices 10, 12, 14 that are distributed over an area A1 associated with the message M1. The first database can be queried by a mobile radio transceiver to retrieve the message M1.

A message M2 is made location dependent by associating it with a geographical area A2. The message is divided into portions and the separate portions are stored only by some or all of the mobile transceiver devices 10, 12, 14 and 16 within the area A2. When a mobile transceiver device leaves the area A2 then the portion(s) of M2 that it stores (if any) are transferred to one or more mobile transceiver devices that are presently within the area A2. The message M2 is therefore distributed amongst a plurality of mobile transceiver devices presently located within the area A2 and the identity of the mobile transceiver devices can change as transceiver devices leave and enter the area A2. The portions of the message M2 are therefore stored in a second adaptive database that comprises an ad-hoc network of transceiver devices 10, 12, 14, 16 that are distributed over an area A2 associated with the message M2. The second database can be queried by a mobile radio transceiver to retrieve the message M1.

The transceivers 10, 12 and 14 located within both area A1 and A2 may store, at the same time, a portion or portions of the messages M1 and M2.

Figure 2:
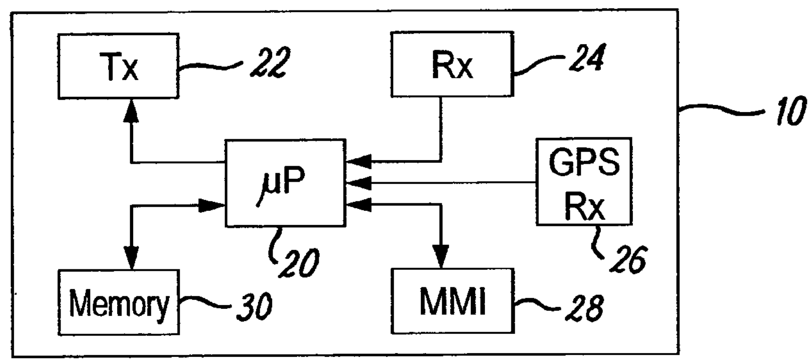
FIG. 2 illustrates a mobile radio transceiver device suitable for participating in the network.

FIG. 2 illustrates a mobile radio transceiver device 10 suitable for participating in the network 2. The radio transceivers 12, 14 and 16 of FIG. 1 are similar. The radio transceiver device 10 comprises a radio frequency transmitter 22 and a radio frequency receiver 24, a memory 30, a Man-Machine-Interface (MMI) 28, a GPS receiver 26, and a processor 20. The processor is connected to each of the other components. The processor 20 is arranged to control the data transmitted by the radio frequency transmitter 22. The processor 20 is arranged to receive data from the radio frequency receiver 24 that has been transmitted to the device 10 by another device participating in the network 2. The GPS receiver 26 provides positioning data to the processor 20 that identifies the position of the radio transceiver device 10. The memory 30 may be written to or read from by the processor 20. The MMI 28 is operable to provide input data to the processor or to provide output data from the processor to the user of the device 10.

The mobile radio transceiver device 10 can be used to deposit a location dependent message as multiple data structures in a distributed database, to operate as part of the distributed database storing a portion of a location dependent message as a data structure or to retrieve the location dependent message from the distributed database where it is stored as multiple data structures.

Figure 3:
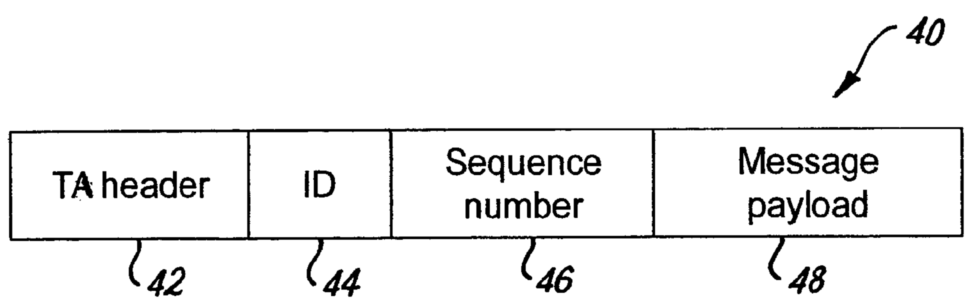
FIG. 3 illustrates a data structure including a portion of a message.

FIG. 3 illustrates a data structure 40, which is used as the vehicle for depositing, storing and retrieving portions of a message. The data structure 40 comprises a target area header 42, an ID 44, a sequence number 46, and a message payload 48. The message payload 48 contains a portion of a message. The target header 42 comprises location information that identifies the target area within which the data structure is to be stored. The location information may define the target area as the centre and radius of a circle e.g. (centre, range). The ID is optional. It may be used for private messages to identify the depositor of the message or the depositor's radio transceiver device and/or it may identify the intended recipient of the message or the intended recipient's radio transceiver device. The sequence number is different for each message portion of the same message. It is used for reassembling the message in the correct order from the various message portions. If encryption is used to secure the data structure 40, the target area header 42 and ID 44 are in the clear and the payload 48 is encrypted. The sequence number 46 is optionally encrypted.

Figure 4A:
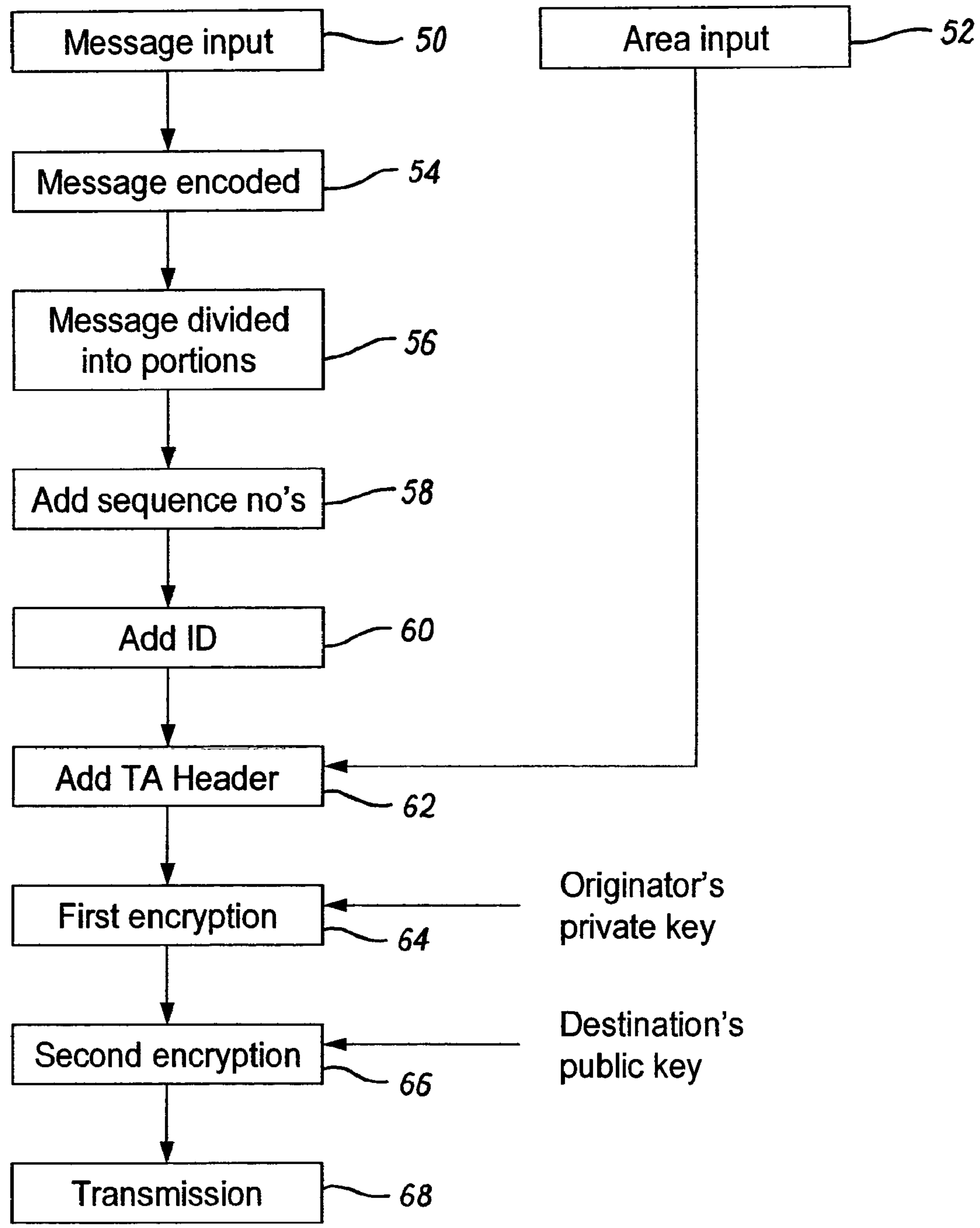
FIG. 4*a* illustrates a process of depositing a private, location dependent, message.

The deposition of a private, location dependent message will now be described with reference to FIG. 4*a*. The steps occur within the processor 20 unless otherwise indicated.

The message is input at step 50. The user may for example enter the message via the MMI 28 or it may be already stored in the memory 30. The message may be any type of message such as an alphanumeric text message, a picture, an audio file, a video clip or a similar multimedia message.

The message is redundantly encoded at step 54 before it is divided into separate portions at step 56. The encoding step 54 is optional, but advantageously allows the original message to be recreated in a retrieving device even if all of the message portions are not received at the retrieving device.

The data structure is then created with steps 58, 60 and 62. Each message portion forms the message payload 48 of a data structure 40. At step 58 a different sequence number 46 is added before each message payload for the same message. The sequence numbers 46 order the separate data structures 40 in a manner corresponding to the order in which the message portions therein should be recombined to recover the original message. At step 60, the ID 44 is added before the sequence number 46. The ID 44 is the same for data structures of the same message. At step 62, the target area header 42 is added before the ID 44. The target area header 42 is the same for data structures 40 of the same message. The target area header comprises location information, identifying a target area, that has been input at step 52. In one embodiment, the user enters the location information via the MMI 28. In another embodiment, the location information is based upon the position of the device only or the position of the device and a user input. The position of the device is for example determined by the GPS receiver 26.

Each data structure 40 of the message is then optionally encrypted at step 64 using the private key of the depositor and then optionally encrypted at step 66 using the public key of the intended recipient of the message.

Each data structure is then transmitted at step 68. The data structure may be included within the payload of a radio packet, such as a Bluetooth radio packet, before transmission. The transmission step 68 is preferably selective, in that the transmitter 22 is controlled by processor 20 to transmit to only radio transceiver devices which are within the target area for the message. For example, referring to FIG. 1, if the target area was A1 and the depositing device is the mobile radio transceiver device 14, then the device 14 selectively communicates within the sub-network 4 and transfers the data structures to the mobile radio transceiver devices 10 and 12.

The processor 20 is capable of identifying which of its neighbouring mobile radio transceiver devices are within the target area by storing location dependent addresses for the devices. For example, the network 2 may identify the participating radio transceiver devices using location dependent IP addresses. The IP address comprises a prefix, such as the site-local unicast address (1111111011) in IPv6, a, location identifier (x bits), and a stateless address (118-x bits). The location identifier may be a GPS position which is 80 bits.

Figure 4B:
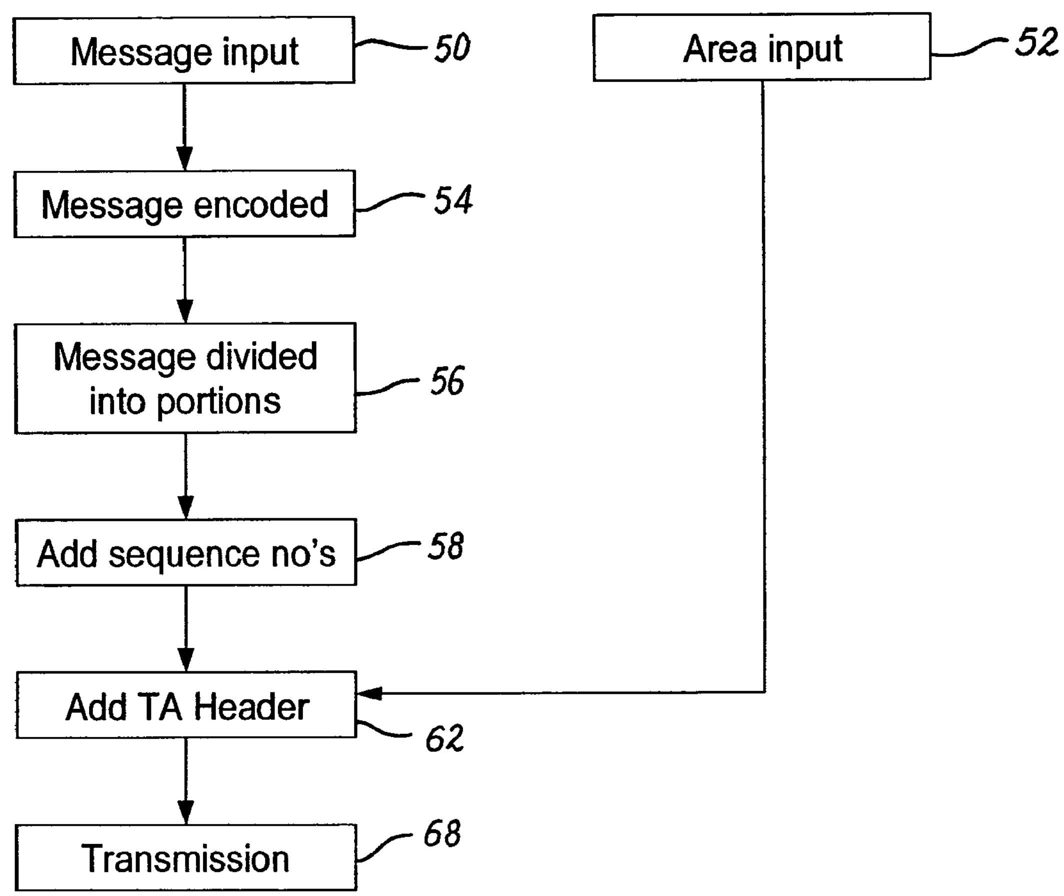
FIG. 4*b* illustrates a process of depositing a public, location dependent, message.

The deposition of a public, location dependent message is illustrated in FIG. 4*b*. In the following description, the steps occur within the processor 20 unless otherwise indicated. The message is input at step 50 as described with reference to FIG. 4*a*. The redundant encoding step 54 is omitted. The data structure is then created with steps 58 and 62 as described with reference to FIG. 4*a*. Step 60 is omitted. The data structures are then transmitted at step 68 as described with reference to FIG. 4*a*.

The retrieval of a location dependent message is initiated by a mobile radio transceiver device, for example device 16 of FIG. 1, which participates in the network 2 broadcasting a request. The request is received by the other mobile radio transceiver devices 10, 12, 14 participating in the network 2. The request may have a different format depending upon whether it is intended to retrieve a private message or a public message. If a public message is to be retrieved, the request identifies the requesting radio transceiver device so that the requisite data structures can be transmitted to it. If a private message is to be retrieved, the request identifies the requesting radio transceiver device and the ID of the data structure to be retrieved.

The retrieving device 16 receives the data structures transmitted in response to the request and stores them in the memory 30. It additionally monitors the sequence numbers and systematically increases the broadcast range of the transmitted request until either it has received all of the data structures of the message or it is no longer receiving any data structures for that message.

The retrieving device 16 decrypts the retrieved data structures, if necessary, using its private key, then the depositor's public key. The message portions within the message payloads 48 of the data structures are concatenated in the order defined by the data structures' sequence numbers. The concatenated message portions either are the recovered message or they are decoded (reverse of redundant encoding) to recover the original message. The message is then stored in the memory 30 from where it can be read for out to a user via the MMI 28.

A mobile radio transceiver device 10 is operable as part of a distributed database that stores the data structures formed from a message. The mobile device 10 stores one or more data structures in its memory 30. Each stored data structure 40 comprises a target area header 42 that identifies a target area within which that data structure 40 should be stored. While the device 10 remains within the target area of a data structure stored in its memory 30, it hosts that data structure by retaining it in its memory. However, when the mobile device 10 moves outside the target area of a data structure stored in the memory 30, it transfers that data structure to a radio transceiver device that is within the area. The processor 20 receives current position data from the GPS receiver 26 (or some similar positioning circuitry). It compares the current position data with the target areas identified by the target area headers 42 of the data structures 40 stored in memory 30. If the current position of the device 10 is outside the target area identified by a data structure, that data structure 40 is prepared for transmission. It is removed from the memory 30 and placed in the payload of a packet, which is transmitted to a selected radio transceiver device. The radio transceiver may be selected because it is positioned within the area identified by the target area header 42 of the data structure 40 to be transferred. The radio transceiver may be selected because there is no neighbouring radio transceiver device within the target area, but it is the nearest device to the target area The processor 20 is capable of identifying which of its neighbouring radio transceiver devices are within the target area by storing location dependent addresses for the devices. For example, the network 2 may identify the participating radio transceiver devices using location dependent IP addresses. The IP address comprises a prefix, such as the site-local unicast address (1111111011) in IPv6, a, location identifier (x bits), and a stateless address (118-x bits). The location identifier may be a GPS position which is 80 bits.

A mobile radio transceiver device 10, operable as part of a distributed database, is capable of receiving data structures via the radio frequency receiver 24 which were transmitted by a depositing mobile radio transceiver device and storing them in the memory 30. A mobile radio transceiver device 10, operable as part of a distributed database, is capable of responding to a request received via the radio frequency receiver 24 from a retrieving mobile radio transceiver device to transfer the requested data structures from its memory 30 to the retrieving mobile radio transceiver device.

According to one embodiment, requested data structures will only be transferred to a retrieving radio transceiver device that is located within the target area identified by the data structures.

The mobile radio transceiver devices may have other uses. They may for example be mobile phones or personal digital assistants which have some mechanism for forming an ad-hoc network (e.g. Bluetooth enabled) and have some mechanism for determining their position (e.g. GPS enabled).

Although embodiments of the present invention have been described in the preceding paragraphs with reference to various examples, it should be appreciated that modifications to the examples given can be made without departing from the spirit and scope of the invention.

The invention claimed is:

1. An apparatus, comprising:
- at least one processor; and
- at least one memory including computer program code for one or more programs,
- the at least one memory and the computer program code configured to, with the at least one processor, cause the apparatus to perform at least the following,
  - store, within a first device, a data structure comprising a portion of a message and location information, wherein the location information identifies an area associated with the message;
  - determine a location of the first device; and
  - transmit the data structure to a second device when the determination of the location of the first device indicates that the first device is no longer located within the area associated with the message.

2. An apparatus according to claim 1, wherein the apparatus is further caused to:
- determine a location of one or more other devices located within the area associated with the message.

3. An apparatus according to claim 2, wherein the apparatus is further caused to:
- select the second device from the one or more other devices located within the area associated with the message.

4. An apparatus according to claim 1, wherein the determination of the location of the first device is performed via one or more of a satellite global positioning system and a cellular positioning system.

5. An apparatus according to claim 1, wherein the apparatus is further caused to:
- store a plurality of data structures, wherein each data structure comprises a different portion of the message and location information identifying the area associated with the message; and
- transmit the plurality of data structures to one or more secondary devices when the determination of the location of the first device indicates that the first device is no longer located within the area associated with the message.

6. An apparatus according to claim 5, wherein the apparatus is further caused to:
- determine a location of one or more other devices located within the area associated with the message.

7. An apparatus according to claim 6, wherein the apparatus is further caused to:
- select the one or more secondary devices from the one or more other devices located within the area associated with the message.

8. An apparatus according to claim 1, wherein the apparatus is further caused to:
- delete the data structure upon transmission to the second device.

9. An apparatus according to claim 1, wherein the first device and the second device participate in an ad-hoc network covering at least the area associated with the message.

10. A method, comprising:

storing, within a first device, a data structure comprising a portion of a message and location information, wherein the location information identifies an area associated with the message;

determining a location of the first device; and transmitting the data structure to a second device when the determination of the location of the first device indicates that the first device is no longer located within the area associated with the message.

11. A method according to claim 10, further comprising:

determining a location of one or more other devices located within the area associated with the message.

12. A method according to claim 11, further comprising:

selecting the second device from the one or more other devices located within the area associated with the message.

13. A method according to claim 10, wherein the determination of the location of the first device is performed via one or more of a satellite global positioning system and a cellular positioning system.

14. A method according to claim 10, further comprising:

storing a plurality of data structures, wherein each data structure comprises a different portion of the message and location information identifying the area associated with the message; and transmitting the plurality of data structures to one or more secondary devices when the determination of the location of the first device indicates that the first device is no longer located within the area associated with the message.

15. A method according to claim 14, further comprising:

determining a location of one or more other devices located within the area associated with the message.

16. A method according to claim 15, further comprising:

selecting the one or more secondary devices from the one or more other devices located within the area associated with the message.

17. A method according to claim 10, further comprising:

deleting the data structure upon transmission to the second device.

18. A method according to claim 10, wherein the first device and the second device participate in an ad-hoc network.

19. A method according to claim 18, wherein the ad-hoc network covers at least the area associated with the message.

20. A non-transitory computer-readable storage medium carrying one or more sequences of one or more instructions which, when executed by one or more processors, cause an apparatus to at least perform the following steps:

storing, within a first device, a data structure comprising a portion of a message and location information identifying an area associated with the message;

determining a location of the first device; and transmitting the data structure to a second device when the determination of the location of the first device indicates that the first device is no longer located within the area associated with the message.

* * * * *